June 30, 1970 J. F. MEACHAM 3,518,495
MOLDED METER SOCKET
Filed Dec. 30, 1968 7 Sheets-Sheet 5

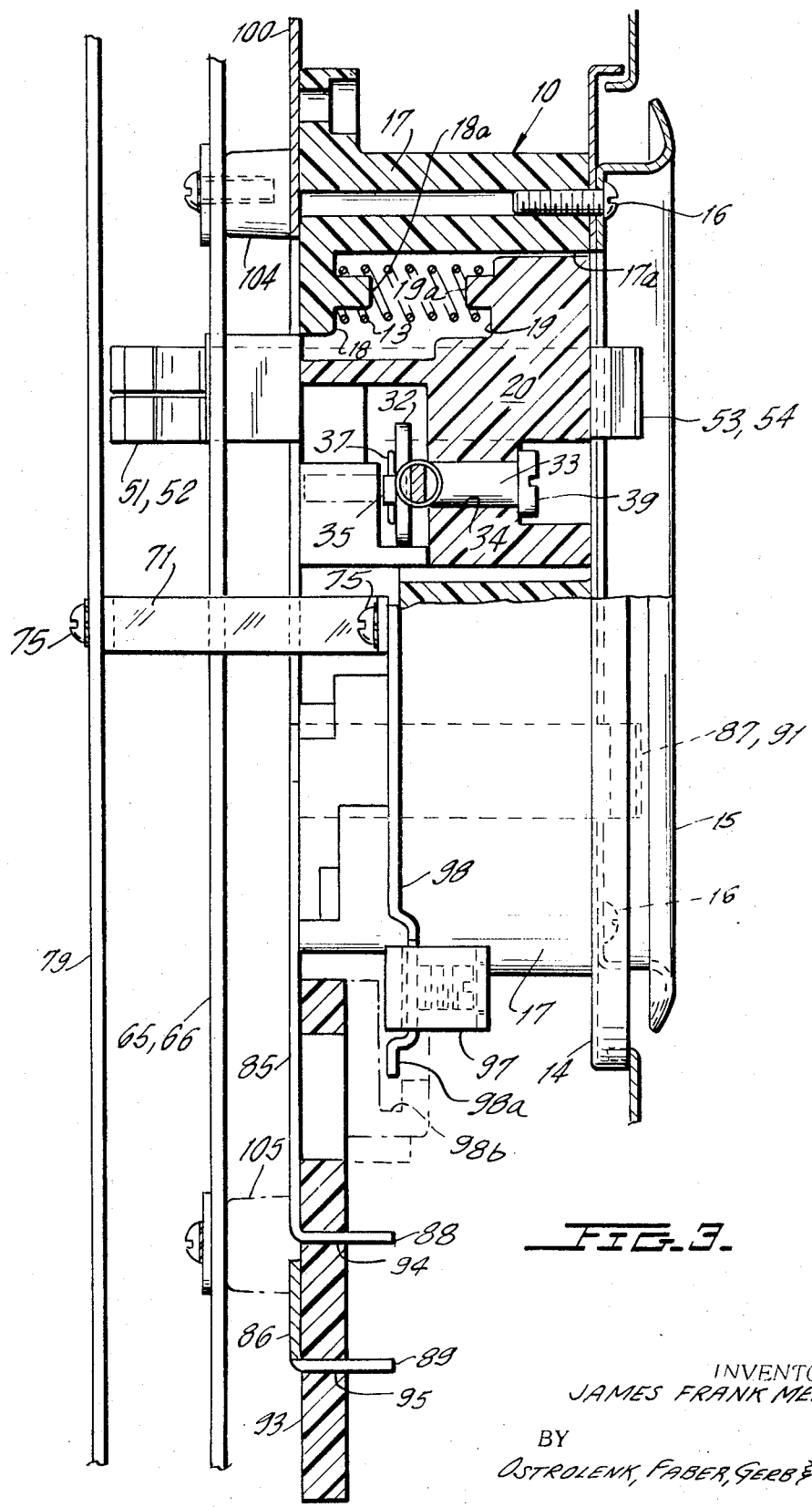

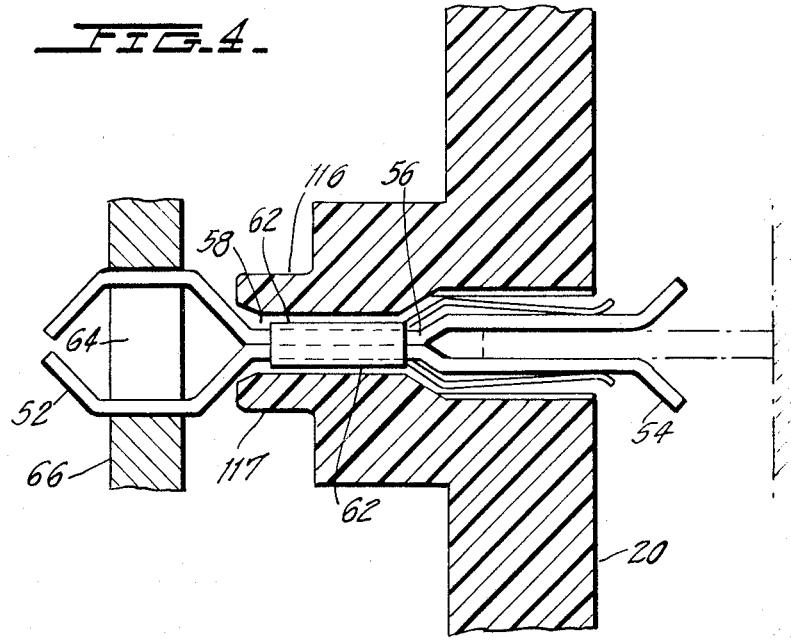
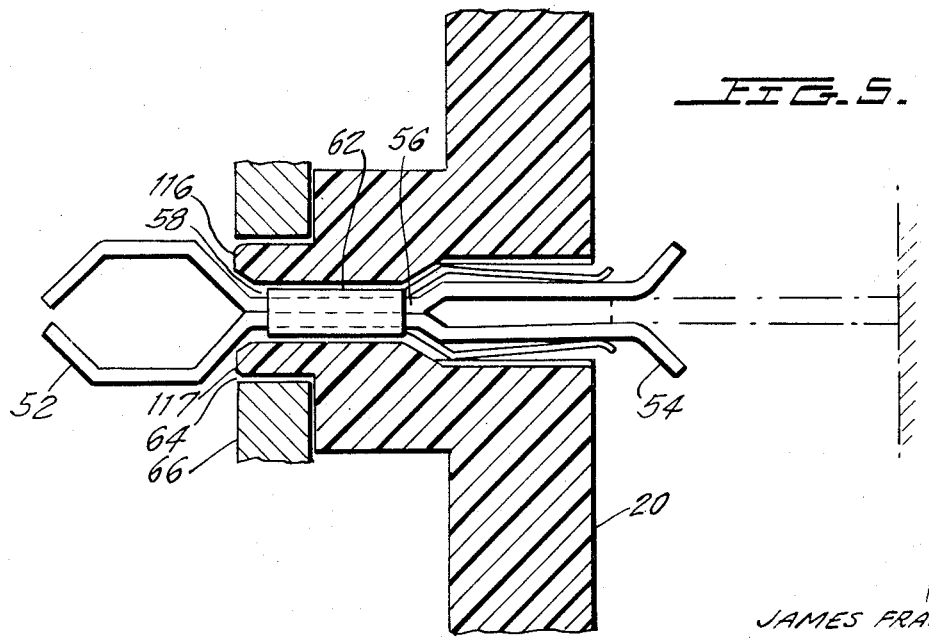

INVENTOR.
JAMES FRANK MEACHAM
BY
OSTROLENK, FABER, GERB & SOFFEN
ATTORNEYS

June 30, 1970  J. F. MEACHAM  3,518,495
MOLDED METER SOCKET

Filed Dec. 30, 1968  7 Sheets-Sheet 6

INVENTOR.
JAMES FRANK MEACHAM
BY
OSTROLENK, FABER, GERB & SOFFEN
ATTORNEYS

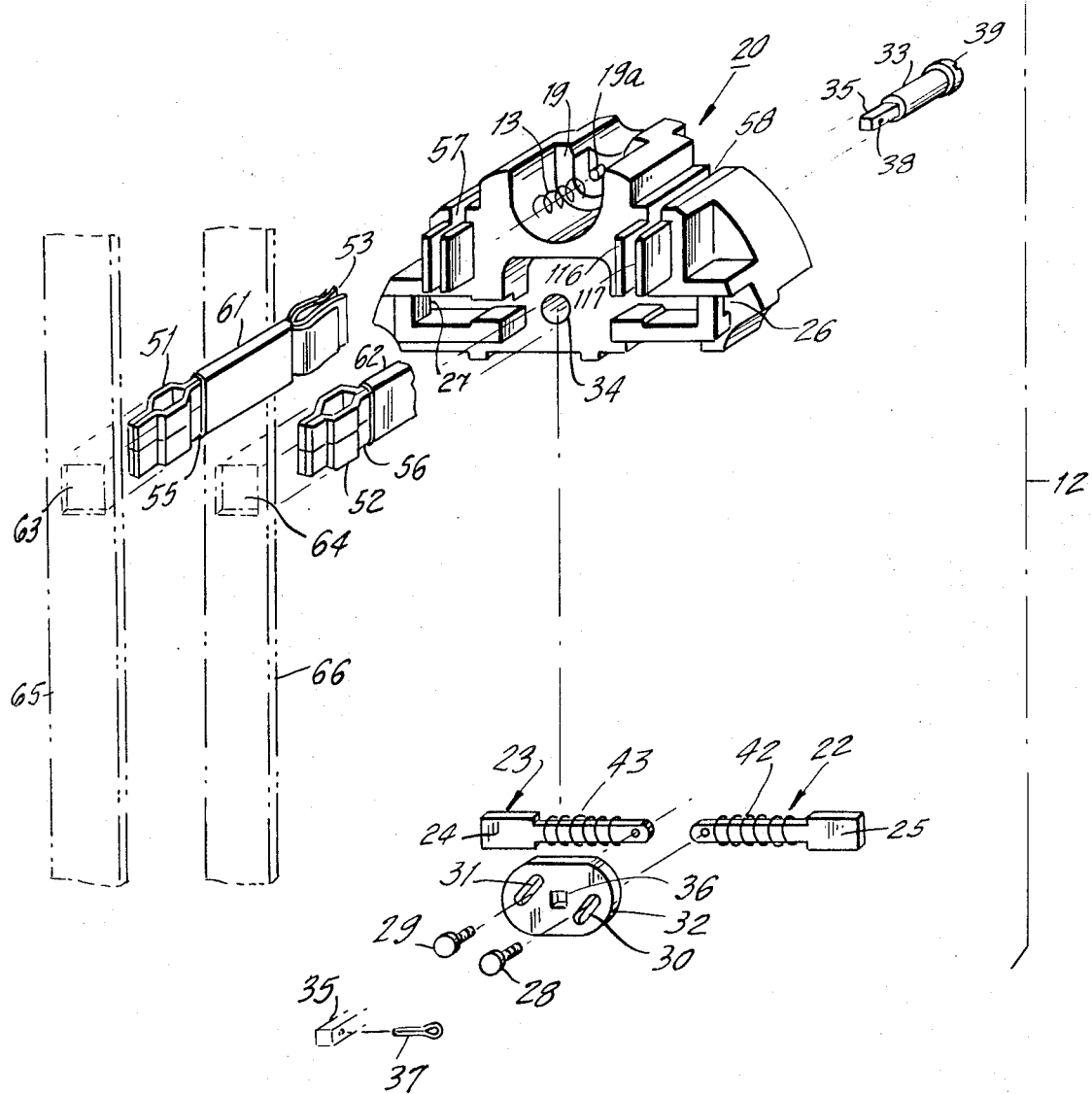

United States Patent Office 3,518,495
Patented June 30, 1970

3,518,495
MOLDED METER SOCKET
James Frank Meacham, Bellmawr, N.J., assignor to I-T-E Imperial Corporation, Philadelphia, Pa., a corporation of Delaware
Filed Dec. 30, 1968, Ser. No. 787,702
Int. Cl. H02b 11/14, 9/00
U.S. Cl. 317—108                          10 Claims

ABSTRACT OF THE DISCLOSURE

A meter socket is constructed with a first molded part mounting plug-in load contacts and a second molded part mounting plug-in line contacts. The line contacts are connected to bus bar engaging fingers also mounted to the second molded part with the latter being biased toward a location relative to the first mold part wherein the fingers are in bus bar engaging position. Means accessible at the front of the socket enable the second part to be moved rearward with respect to the first part to a position wherein the fingers are in bus bar disengaging position so that a meter inserted in the socket at this time will not act as a bridge between energized bus bars and an electrical load.

---

This invention relates to meter sockets in general and more particularly relates to a molded meter socket having line contacts that are readily and safely disconnectable from the energizing bus bars.

Many occasions arise when it is desirable to use a watt-hour meter for disconnecting an electrical load from its energizing source knowing that the two will not be accidentally or readily reconnected by an unauthorized person. It is also desirable to have the meter remain in its socket while the load is deenergized. Further, it is desirable to have the meter in the same angular orientation regardless of whether the load is energized or deenergized.

In order to obtain all of the aforesaid desirable features, the instant invention provides a meter socket construction utilizing two molded sections, one stationary and the other movable between a forward and a rearward position. The movable section is biased toward its forward position wherein conducting fingers carried thereby are engageable with energizing bus bars.

Means accessible from the front of the socket are operable to permit the second molded member to be moved to its rearward position wherein the contact fingers disengage the energizing bus bars. Regardless of the position of the second molded number the watt-hour meter or the like may be mounted to the socket in the same angular position.

Accordingly, a primary object of the instant invention is to provide a novel molded meter socket.

Another object is to provide a molded meter socket in which the line terminals are selectively movable to a position wherein bus bar engaging fingers carried thereby are disengaged from the energizing bus bars.

Still another object is to provide a meter socket in which the contact fingers thereof are biased toward engagement with the energizing bus bars and are operable rearwardly to disengage the bus bars.

These objects as well as other objects of this invention will become readily apparent after reading the following description of the accompanying drawings in which:

FIG. 3 is a cross-section taken through line 3—3 of FIG. 1 looking in the direction of arrows 3—3.

FIG. 4 is a fragmentary cross-section showing details of the engagement between a contact finger and energizing bus bar.

FIG. 5 is a view similar to FIG. 4 showing the contact finger disengaged from the bus bar.

FIG. 8 is an exploded perspective of the auxiliary molded section and elements mounted thereto.

Figure 7:
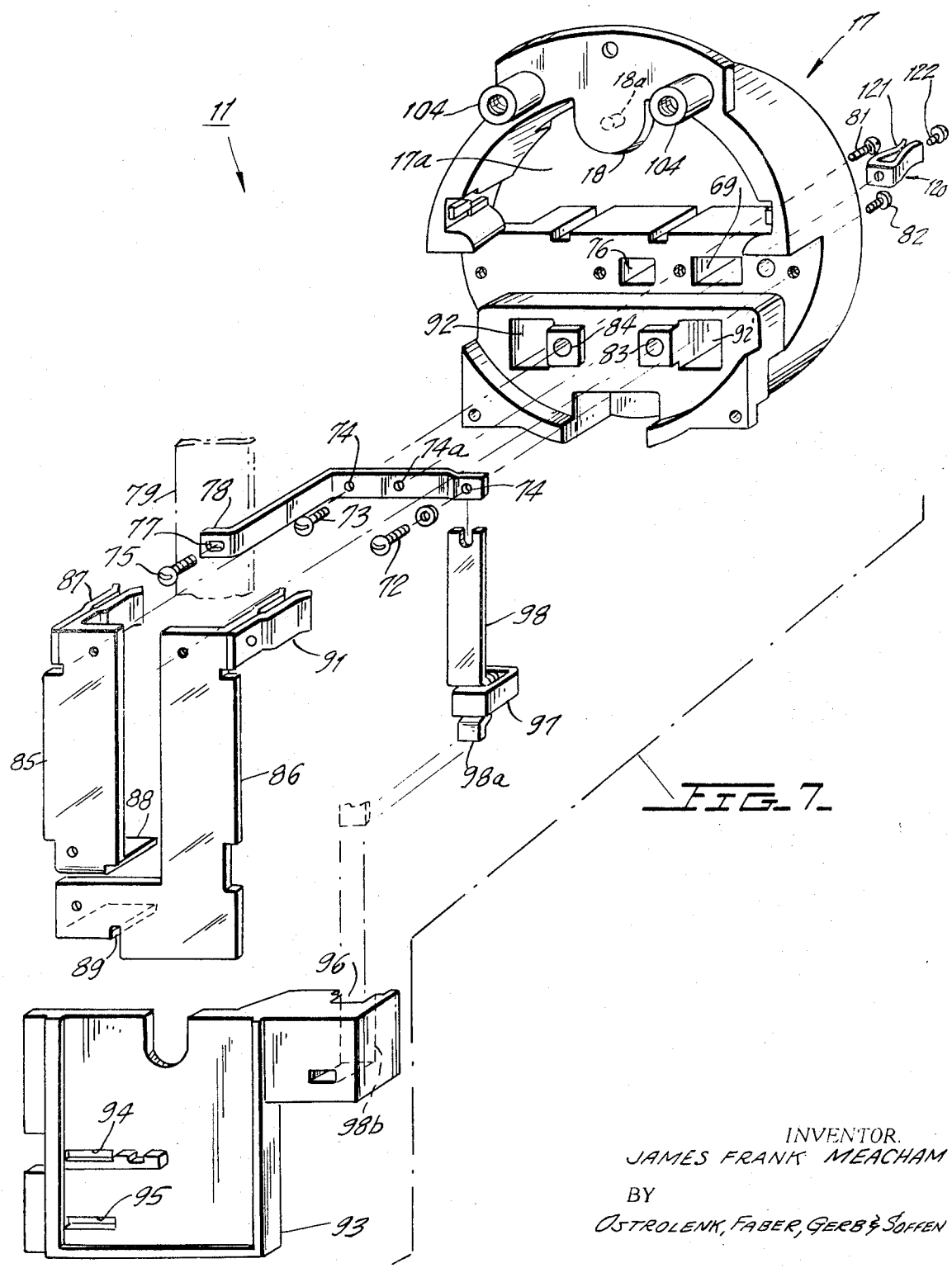
FIG. 7 is an exploded perspective of the main molded section and elements mounted thereto.

Now referring to the figures, meter socket 10 consists of main subassembly 11 (FIG. 7), auxiliary subassembly 12 (FIG. 8), slideably mounted to main assembly 11 and biased forward by compression spring 13, face ring 14 positioned forward of assembly 11, and locking ring 15 positioned forward of face ring 14. Four screws 16 extend through clearance apertures 15a in locking ring 15, clearance apertures 14a face ring 14, and are received by threaded apertures 11a in main molded insulating support member 17.

Member 17 is shaped as a relatively thick disc having generally semicirculaar opening 17a extending from front to back thereof. Biasing spring 13 is disposed in opening 17a being seated on the forward surface of ledge 18 and being positioned by forward protrusion 18a. The other end of spring 13 is positioned by protrusion 19a extending rearward from ledge 19 of auxiliary molded insulating support member 20 of auxiliary assembly 12.

Auxiliary member 20 is generally semicircular and relatively thick to substantially complement the shape of opening 17a wherein member 20 is slideably mounted. Face ring 14 is positioned and shaped to block or limit forward movement of auxiliary member 20 relative to main member 17. However, the operative forward position of member 20 is with its forward surface coplanar with the forward surface of main member 17 and is established by locking rods 22, 23 movable into locking depressions 24, 25, respectively in main member 17.

Rods 22, 23 extend through slots 26, 27 near the rear of auxiliary member 20 and are secured at their inner ends to rivets 28, 29, respectively, extending through cam slots 30, 31, respectively, and tie plate 32. The latter is keyed to operating shaft 33 extending through circular passage 34 in auxiliary member 23. The rear end of shaft 33 is provided with square cross-sectioned formation 35 which extends through complementary square aperture 36 in plate 32, thereby keying the latter to shaft 33. Cotterpin 37 extends through aperture 38 in formation 35 to secure plate 32 to shaft 33. Large slotted head 39 at the forward end of shaft 33 is disposed in the bottom of enlarged recess 41 at the forward end of passage 34 so as to be accessible for operation by a conventional screw driver.

It should now be apparent to those skilled in the art that clockwise pivoting of shaft 33 (when viewed from the head end thereof) is effective to retract blocking rods 22, 23 from their normal extended positions to which they are biased by spring 42, 43, respectively, which bear against enlarged formations of rods 22, 23 and against ledge portions of auxiliary member 20. It should also be apparent to those skilled in the art that cam slots 30, 31 are so shaped that when rod 33 is rotated to its most clockwise position, rods 22, 23 will remain retracted until shaft 33 is positively pivoted in a counterclockwise direction. When rods 22, 23 are in their extended position, rear surface portion 24a, 24b of main member 17 prevent forward movement of auxiliary assembly 12 after the latter has been moved to its rearmost position against the force of biasing spring 13 for reasons to be hereinafter explained.

Auxiliary assembly 12 also includes line contact fingers 51, 52 positioned to the rear of member 20 and jaw type plug-in contacts 53, 54 at the front of member 20 to receive the line contacts of a watt-hour meter or the like (not shown). Contact 53 and contact finger 51 are connected by strap means 55 extending through slot 57 in member 20 while contact 54 and contact finger 52 are connected by strap means 56 extending through slot 58 in member 20. Pressure for contact 53 is provided by member 61 of sheet spring material folded across the broad faces of strap means 55 and having forward extensions engaging the jaws of contact 53. Spring member 62 constructed of sheet spring material provides biasing forces for the jaws of contact 54. As will hereinafter be seen, with auxiliary asembly 12 in its forward position contact fingers 51, 52 are disposed in rectangular apertures 63, 64 of energizing bus bars 65, 66, respectively, with the outer surfaces of contact fingers 51, 52 being in good electrical contact with bus bars 65, 66, respectively.

L-shaped neutral strap 71 is secured to the bottom of main member 17 by screws 72, 73 extending through two clearance apertures 74 and through threaded apertures in main member 17. Screw 75, accessible through hole 76 in member 17, extends through clearance aperture 77 in out-turned ear 78 of neutral strap 71 to connect the latter to neutral bus bar 79. Neutral terminal jaw means 120 and pressure spring 121 therefor are positioned in main member recess 69 and connected to neutral strap 71 by screw 122 extending into hreaded aperture 74a of strap 71.

Figure 1:
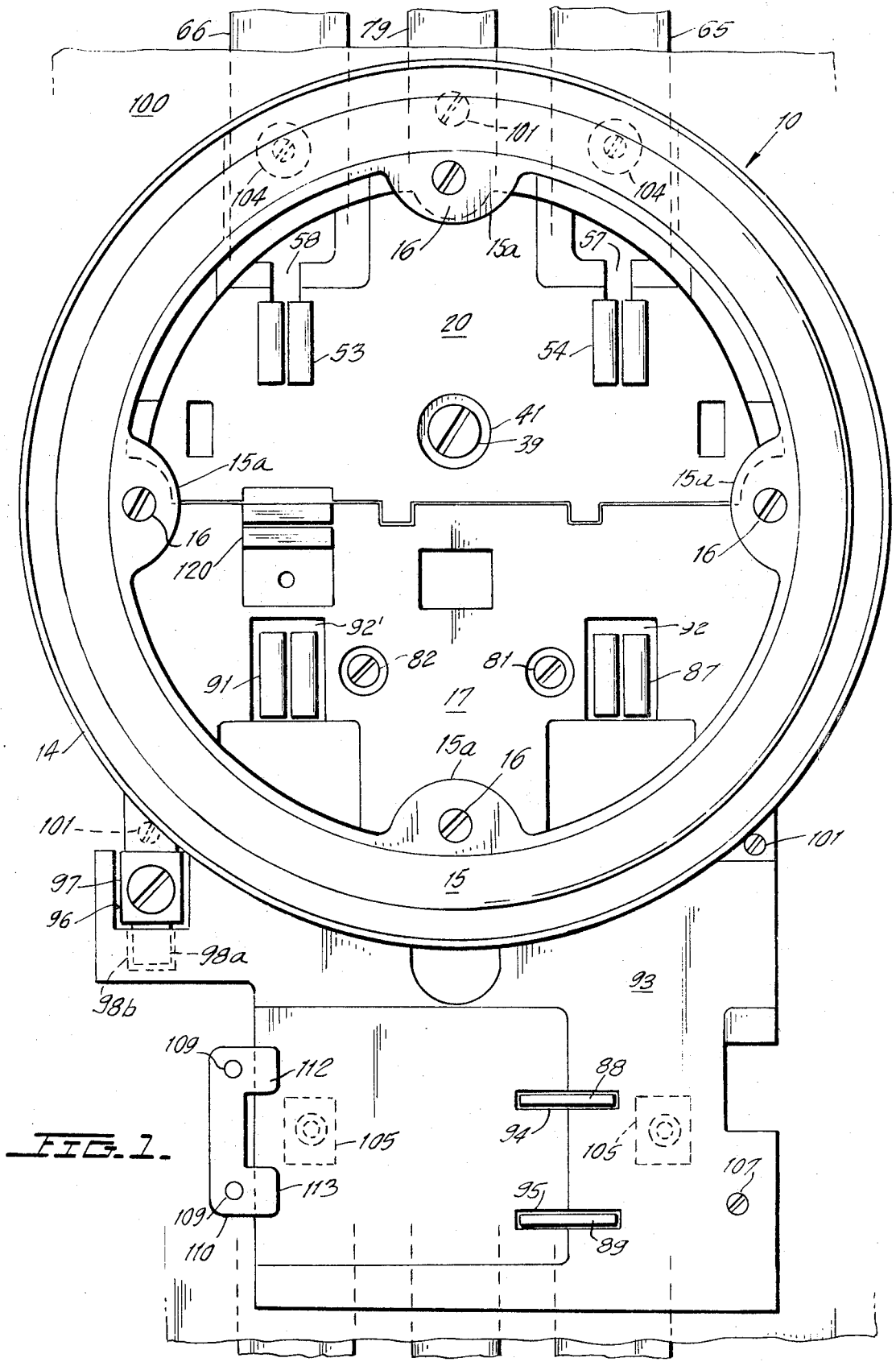
FIG. 1 is a front elevation of a meter socket constructed in accordance with the teachings of the instant invention together with fragmentary portions of a panel to which the socket is mounted.
Figure 2:
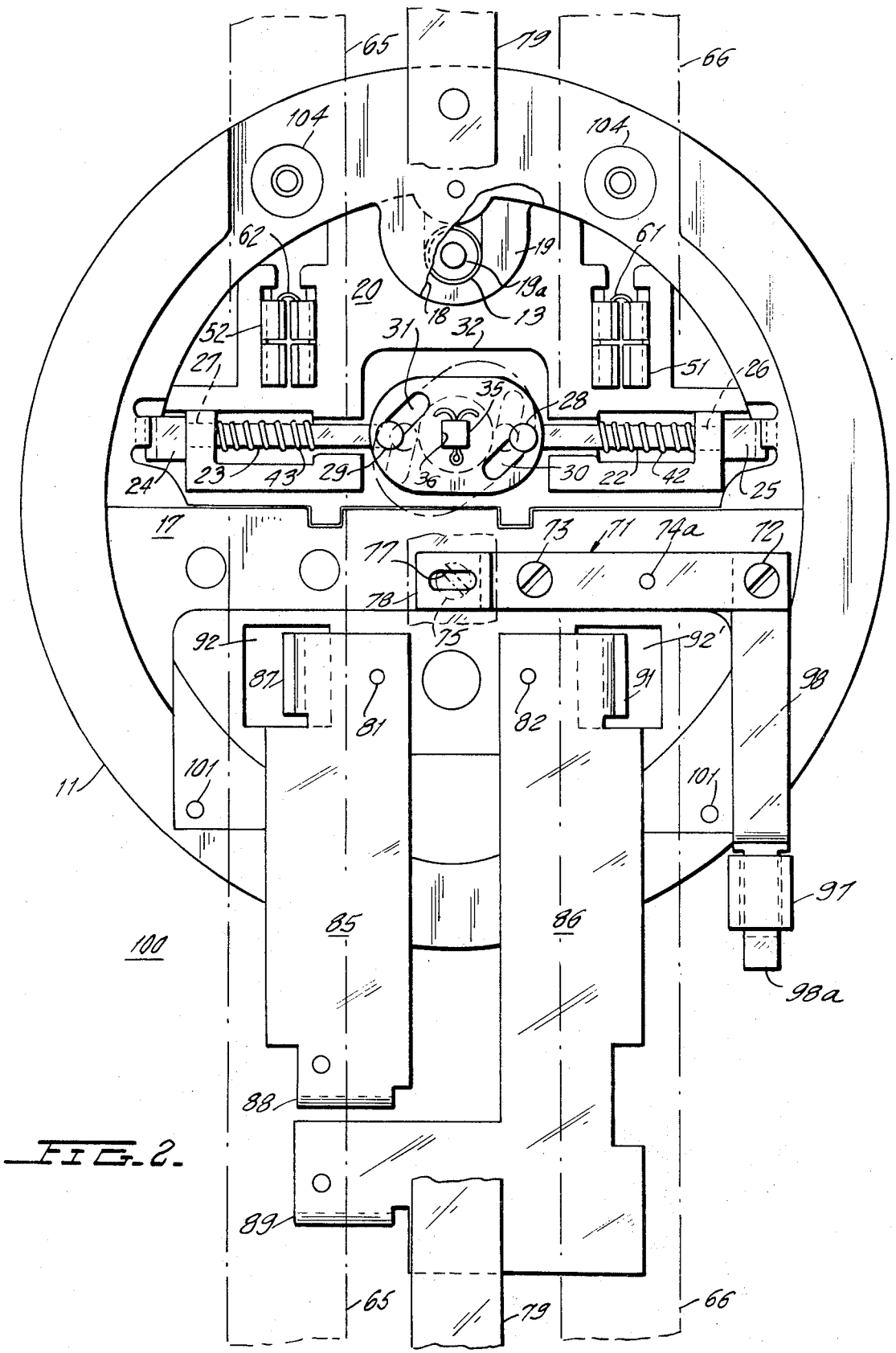
FIG. 2 is a rear elevation of the meter socket shown in FIG. 1.
Figure 6:
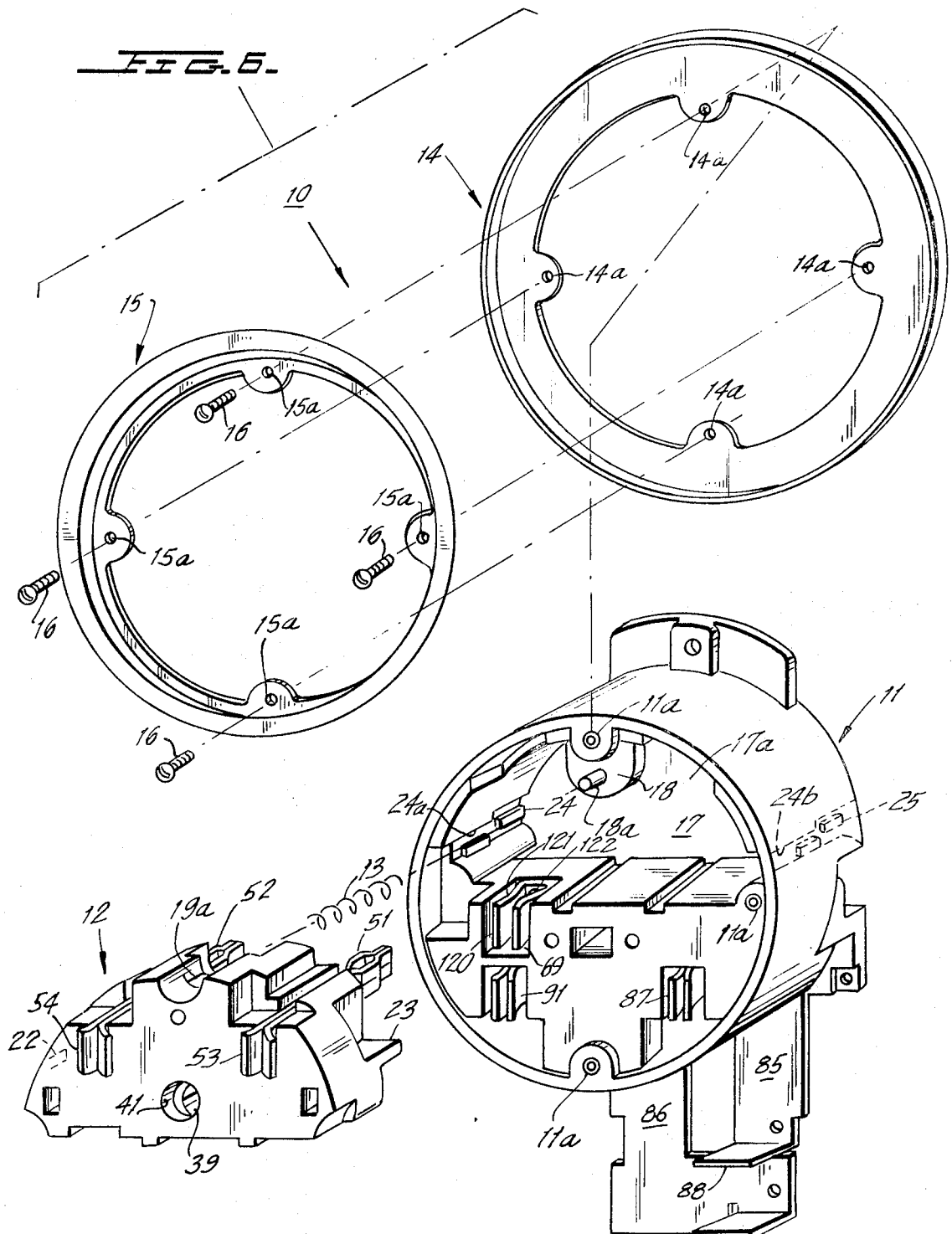
FIG. 6 is an exploded perspective showing the relationship between the main elements and/or assemblies of the meter socket.

Screws 81, 82 extend through apertures 83, 84 respectively, in main member 17 to secure load straps 85, 86, respectively, to main member 17 at the rear thereof. Contact jaws 87 mounted at one end of strap 85 extend forwardly through main member aperture 92 while the other end of strap 85 is bent forwardly to form stab 88 to provide a line terminal for one pole of a plug-in circuit breaker (not shown) connected in series with circuit with meter socket 10. Similarly, plug in jaws 91 extend forwardly from one end of strap 86 through main member aperture 92 while the other end of strap 86 is forwardly bent to form stab 89. It is noted that strap 86 is L-shaped so as to position stab 89 in alignment with stab 88 (See FIG. 1). The operative spacing between stabs 88, 89 is established by slots 94, 95, respectively, in sheet-like insulating member 93. Member 93 is also provided with forwardly stepped ledge portion 96 which supports tubular wire grip 97 mounted at one end of strap 98. The other end of strap 98 is slotted to fit around the threaded portion of screw 72 for electrically connecting strap 98 to neutral strap 71. End 98a of strap 98 extends beyond wire grip 97 and is downwardly stepped up to project into slot 98b of insulator 93 for stabilizing the position of strap 98 and wire grip 97 mounted thereon.

Three screws 101 extend through clearance apertures in outward extensions at the rear of main member 17 to fixedly secure the latter to meter panel wall 100 on the forward side thereof. Member 17 is positioned over an appropriately shaped aperture in wall 100 through which the electrical conducting elements of meter socket 10 extend. Bus bars 65 and 66 are coplanar and extend parallel to one another being fixedly secured to main support section 17 and sheet insulator 93.

Bosses 104 extending rearwardly from main section 17, and bosses 105 extending rearwardly from sheet insulator 93, support buses 65, 66 to the rear of panel wall 100 in spaced parallel relationship with respect thereto. Co-operating formations of sheet insulator 93 and wall 100 position insulator 93 on the forward surface of wall 100 over an appropriately shaped opening therein with screw 107 providing mechanical securement. Rivets 109 secure bracket 110 on the forward surface of wall 100. Hook formations 112, 113 of bracket 110 are aligned opposite stabs 88, 89, respectively, to provide pivot points about which a double pole circuit breaker (not shown) is pivoted into electrical engagement with stabs 88, 89.

Since the engagement with contact fingers 51, 52 and the respective bus bars 65, 66 are identical, only a description of the latter will be undertaken herein with particular reference to FIGS. 4 and 5. In FIG. 4 auxiliary molded insulating member 20 is shown in its forward position while in FIG. 5 member 20 is shown in its rear position. In the position of FIGURE 4 contact finger 52 is disposed within bus bar aperture 64 and the outwardly bowed sections of finger 52 are in frictional engagement with the internal walls of bus bar aperture 64 with the frictional contact achieving a good electrical connection between contact jaws 54 and bus bar 66.

When auxiliary molded support member 20 is moved to its rearward position of FIG. 5 all the other elements of auxiliary assembly 12 also move rearward. In the position of FIG. 5, contact finger 52 is to the rear of bus bar 66 and insulating barriers 116, 117 on each side of the region where contact finger 52 is connected to strap 56 are disposed within bus bar aperture 64 and the electrical connection between contact jaws 54 and bus bar 66 is broken. At this time, even though a watt-hour meter may be mounted to socket 10 in the ordinary aligned position for the meter, the latter wil not be energized.

Thus, it is seen that the instant invention provides a novel and simplified construction for a meter socket including two molded members as the main insulating supports for the conducting elements. One of the insulating members is selectively movable with respect to the other insulating member so as to operate the line contacts into and out of engagement with the energizing bus. However, when the line contacts are disengaged from the energizing bus, this condition will not be apparent to those unskilled in the art and even if such condition is apparent the means for reconnceting the line terminals to the bus bars is not readily apparent. Further, even when the line terminals are disconnected from the bus bar the meter is mounted to the socket in the same position occupied by a meter in an energizing socket.

Although there have been described preferred embodiments of this novel invention, many variations and modifications will now be apparent to those skilled in the art. Therefore, this invention is to be limited not by the specific disclosure herein, but only by the appended claims.

I claim:

1. Mounting structure for a plug-in meter; said structure comprising a socket including a fixedly mountable main section; an auxiliary section mounted to said main section for movement relative thereto between a first position and a second position rearward of said first position; a first pair of meter terminal engaging contacts mounted to said main structure and accessible from the front of said socket; a second pair of meter terminal engaging contacts fixedly mounted to said auxiliary section and accessible from the front of said socket; an individual bus bar engaging finger fixedly connected to each of said contacts of said second pair and extending to the rear of said auxiliary section; biasing means urging said auxiliary section toward said first position; means operable from the front of said socket for maintaining said auxiliary section in said second position; with said auxiliary section in one of said first and second positions with said fingers disposed in bus bar engaging position and with said auxiliary section in the other of said first and second positions said fingers disposed in bus bar disengaging position.

2. Mounting structure as set forth in claim 1 in which said main section is a unitary structure molded of insulating material, and said auxiliary section is also a unitary structure molded of insulating material.

3. Mounting structure as set forth in claim 2 also comprising a locking ring secured to said main section and positioned forward thereof.

4. Mounting structure as set forth in claim 2 in which individual conducting straps extend from each contact of said first pair and terminate in line terminals engageable by cooperating line terminals of a circuit breaker means.

5. Mounting structure as set forth in claim 4 in which there is an insulating member separating said line terminals; a neutral strap secured to said main section and terminating in a wire connector supported by said insulating member.

6. Mounting structure as set forth in claim 2 in which said auxiliary section includes shield portions around forward extensions of said fingers; with said fingers in said bus bar disengaging position said shield portions occupying general locations occupied by said fingers when in said bus bar engaging position.

7. Mounting structure as set forth in claim 6 in which said bus bar engaging position is in front of said bus bar disengaging position.

8. Mounting structure as set forth in claim 7 in which said main section includes formations for insulating support of bus bars engageable by said fingers.

9. Mounting structure as set forth in claim 7 in which the means for maintaining said auxiliary section in said second position includes slide bars biased in opposite directions toward locking positions and a pivoted member to which said slide bars are connected for simultaneous controlled movements.

10. Mounting structure as set forth in claim 7 in which individual conducting straps extend from each contact of said first pair and terminate in line terminals engageable by line terminals of a circuit breaker means, an insulating member separating said line terminals; a neutral strap secured to said main section and terminating in a wire connector supported by said insulating member.

References Cited

UNITED STATES PATENTS

| | | | |
|---|---|---|---|
| 2,606,232 | 8/1952 | St. John | 317—108 |
| 3,375,409 | 3/1968 | Sturdivan | 317—104 |

LEWIS H. MYERS, Primary Examiner

G. P. TOLIN, Assistant Examiner